United States Patent Office 3,558,287
Patented Jan. 26, 1971

3,558,287
PROCESS OF PRODUCING MICROCRYSTALLINE LIPOPHILIC AND HYDROPHILIC AMMONIUM NITRATE
Marcel Vercauteren, Lima, Peru, assignor to Hirtenberger Patronen-, Zundhutchen- und Metal-Warenfabrik Aktiengesellschaft, Hirtenberg, Austria, a corporation of Austria
No Drawing. Filed Oct. 18, 1967, Ser. No. 676,021
Claims priority, application Austria, Nov. 18, 1966,
A 10,696/66
Int. Cl. B01d 9/02; C01b 21/48
U.S. Cl. 23—300                                    4 Claims

ABSTRACT OF THE DISCLOSURE

A method of producing microsrystalline ammonium nitrate by crystallizing concentrated or saturated solutions of ammonium nitrate in the presence of salts of primary amino alkanes in an amount of from 0.1 to 5% by weight, having chain-lengths ranging from $C_8$ to $C_{18}$, and in the presence of salts of amino alkanols in an amount of from 0.2 to 5% by weight, at a temperature between 20° and 90° C.

---

The present invention relates to a process of producing microcrystalline ammonium nitrate by crystallization from concentrated or saturated solutions of ammonium nitrate in the presence of salts of primary amino alkanes in an amount of 0.1–5% by weight, preferably 0.2–1% by weight related to the weight of ammonium nitrate, their chain-lengths ranging from $C_8$–$C_{18}$, preferably from $C_{12}$–$C_{14}$.

The production of explosives or propellants containing inorganic nitrate, particularly ammonium nitrate, is already known, whereby the nitrate is either a component or the substance from which the explosive is produced by treating it with 0.001 to 1.5 g. alkylamine with at least 6 carbon atoms in the alkyl group for every 100 g. of nitrate. This is to obtain a lower plastic viscosity and a lower yield point in the case of plastic explosives and a higher density in the case of powdery explosives.

It is an object of the present invention to produce microcrystalline ammonium nitrate with lipophilic characteristics. The process of the present invention for the production of microcrystalline ammonium nitrate by crystallization from concentrated or saturated solutions of ammonium nitrate in the presence of salts of primary amino alkanes in an amount of 0.1–5% by weight, preferably 0.2–1% by weight related to the weight of ammonium nitrate, their chain-lengths ranging from $C_8$–$C_{18}$, preferably from $C_{12}$–$C_{14}$, is characterized in that for the production of an ammonium nitrate with lipophilic surface characteristics the ammonium nitrate is crystallized out in the presence of salts of amino alkanoles in an amount of 0.2–5% by weight, preferably 0.4–1% by weight related to the weight of ammonium nitrate, and at a temperature between 20°–90° C.

The ammonium nitrate obtained by means of the process according to the present invention is not only pulverulent but the produced crystals of ammonium nitrate show a smooth, lipophilic surface which is capable of adsorbing comparatively large quantities of organic liquids in a thermodynamically stable manner. The produced crystals have the shape of rhombohedral needles whose diameters generally do not exceed 10 microns; the lengths of the needles may greatly exceed 10 microns and they depend on the production conditions, such as temperature and concentration.

The salts of amino alkanes are contained in the concentrated aqueous solution of ammonium nitrate in the form of liquid crystals (mesophasis) and they have the special characteristic of sedimenting on the surface of the precipitating crystals as adsorbent in a closely packed manner. Therefore the entire surface of the ammonium nitrate crystal has the physical characteristic of hydrocarbon chain, whereby it is made possible that this surface holds liquid hydrocarbons or other organic liquids in a thermodynamically stable manner by means of adsorption. All the salts derived from amino alkanes which dissolve in a hot concentrated solution of ammonium nitrate in the form of long-chain micella (liquid crystals) may be used. Salts derived from amino alkanes and acetic acid, formic acid, lactic acid, or nitric acid are particularly suited.

The characteristic feature of short-chained amino alkanoles is to preserve the liquid-crystalline state of the amino alkanes throughout a wide range of concentration and temperature so that the obtained ammonium nitrate crystals do not lose their lipophilic character, even after storage. When producing the lipophilic ammonium nitrate the salts of amino alkanes or of amino alkanoles may either be added directly to the concentrated ammonium nitrate solution or they may be formed in-situ by adding amino alkanes or amino alkanoles and the desired organic or inorganic acids or acid salts. Any conventional method can be applied, such as continuous or discontinuous crystallization with subsequent filtration, centrifuging, or drying, to crystallize out the ammonium nitrate as such. Crystallization may be effected by means of cooling, evaporation of the water of the solution at atmospheric or reduced pressure, or by drying by means of spraying.

The obtained microcrystalline, lipophilic ammonium nitrate, produced according to the process of the present invention is particularly suited for the production of explosives and blasting agents, and the explosives and blasting agents produced with the ammonium nitrate obtained according to the process of the present invention are far superior to corresponding explosives and blasting agents produced with conventional ammonium nitrate with regard to brisance and ignition sensitivity.

In order to demonstrate the superiority of the microcrystalline ammonium nitrate produced according to the method of the present invention comparative tests were performed which are described in the following Examples 1 to 5. Examples 1–3 are a comparison between embodiments containing long-chained amino alkanes, on the one hand and long-chained amino alkanes and short-chained amino alkanols on the other hand. Example 4 demonstrates the necessity to observe the temperatures. Example 5 shows the advantageous characteristic of the explosive and of the blasting agent of not only being lipophilic but also hydrophilic, a highly astonishing fact since these two qualities actually contradict each other.

EXAMPLE 1

(A) The following mixture is added to 10 kg. of a 80% ammonium nitrate solution, related to the total mixture with a temperature of 65° C.

|  | G. |
|---|---|
| n-Dodecylamine acetate | 25 |
| Triethanolamine acetate | 75 |

The amine mixture is homogenously mixed with the solution and subsequently permitted to cool to room temperature and to crystallize out during 24 hours without agitation. The crystals thus obtained are separated out by means of a Buchner funnel and pressed to a large extent. Analysis showed that the obtained ammonium nitrate still contains 3.2% moisture related to the wet product. Without further drying 200 g. fuel oil No. 4 are added to 4.800 g. lipophilic ammonium nitrate by means of a small laboratory mixer.

(B) The same experiment was carried out at same conditions, however using only 25 g. n-dodecylamine acetate. Now the ultimate moisture amounted to 2.8% related to the wet product. Fuel oil No. 4 was also added to this mixture. By using explosive mixtures A and B the usual explosion characteristics of explosives were determined, which had been permitted to age for 1 day, 1 week, and 1 month.

|  | 1 day | | 1 week | | 1 month | |
|---|---|---|---|---|---|---|
|  | A | B | A | B | A | B |
| Excavation value according to Trauzl (net cm.³) | 390 | 370 | 385 | (¹) | 380 | (¹) |
| Upsetting value according to Hess (dual strength steel disc) mm | 17.0 | 15.5 | 16.7 | | 16.5 | |
| Detonation speed according to Dautriche (zinc pipe —30 mm. φ) —m/sec | 4,300 | 3,700 | 4,100 | | 4,000 | |
| Detonation transmission (on sand) in 22 mm. φ per 175 mm. length, cm | 4 | 2 | 4 | | 4 | |

¹ After one week mixture B was already insensitive towards detonators No. 6 or No. 8 and the normal explosion characteristics could not be determined which serves as evidence for the fact that the unstable aminoalkane coating (in the absence of alkanolamine) begins to decompose after the cooling of the ammonium nitrate has come to an end. On the other hand mixture A retained its sensitivity and its explosion characteristics.

EXAMPLE 2

(A) In a small laboratory vacuum evaporator (contents 20 liter) 12 kg. ammonium nitrate were heated in 2.1 l. water to a temperature of 85° C. Furthermore, 30 g. tetradecylamine lactate and 120 g. 2-amino-2-methyl-1-propanol-lactate were added. The vacuum evaporator was put into a water bath with a constant temperature of 85° C. Evaporation (at first boiling) was carried on for 3½ hours, maintaining a vacuum of 80–30 torr. The product obtained contained 0.32% final moisture, related to the wet product.

(B) At the same time a second equivalent chemical was prepared, however without the 2-amino-2-methyl-1-propanol-lactate. This ammonium nitrate contained a moisture of 0.22%. This time the ammonium nitrate of chemicals A and B was reserved without mixing and 4% Fuel oil No. 4 related to the total mixture was added after 1 week, 1 month, and 6 months.

After a 24-hour aging of these explosive mixtures the explosion characteristics were determined.

|  | 1 week | | 1 month | | 6 months | |
|---|---|---|---|---|---|---|
|  | A | B | A | B | A | B |
| Excavation value according to Trauzl, net cm.³ | 385 | (¹) | 385 | (¹) | 380 | (¹) |
| Upsetting value according to Hess (dual strength steel disc) mm | 17.0 | | 17.0 | | 16.5 | |
| Detonation speed according to Dautriche (zinc pipe 30 mm. φ) m./sec | 4,150 | | 4,100 | | 4,000 | |
| Detonation transmission (on sand) in 22 mm. φ per 175 mm. length, cm | 2 | | 2 | | 2 | |

¹ Again it was found out that explosive mixtures with ammonium nitrate B showed no detonation sensitivity towards detonators No. 6 and No. 8. Furthermore, it was observed that ammonium nitrate B gradually changed its structure already after few days to become a sandy, coarse material. Ammonium nitrate A still showed its typical lipophilic characteristics after 6 months of storage.

EXAMPLE 3

Two mixtures A and B were prepared according to Example 2, the only difference being that evaporation was interrupted after 3 hours. The final moisture of this ammonium nitrate was determined by analysis as follows:

A: 1.30% related to the wet product
B: 1.25%, related to the wet product

In both cases explosive mixtures were produced with 4% fuel oil No. 4 related to the total mixture after 1 week, 1 month, and 6 months of storage. Again chemical B was found to be insensitive to detonation. For chemical A the figures obtained were the same as in Examples 1 and 2.

The typical characteristic to be observed was that ammonium nitrate B had turned almost completely into conventional ammonium nitrate after one week, the ammonium nitrate B being of the typical sandy and coarse nature and having furthermore a moist feel to it as if 1.25% water related to the total mixture had been admixed to a conventional ammonium nitrate.

On the other hand ammonium nitrate A still proved to be pulverulent, dusty, and of a dry feel, inspite of its similar moisture contents, even after 6 months storage.

EXAMPLE 4

(A) The following solution was prepared in the laboratory vacuum evaporator of Example 2: 12 kg. ammonium nitrate plus 1.3 l. water, at a temperature of 102° C. 30 g. n-dodecylamine acetate and 100 g. dimethyl ethanol amine acetate are added. The temperature of the water bath of the evaporator was adjusted at 105° C.

(B) Another experiment was carried out in the following manner: 12 kg. ammonium nitrate are dissolved in 1.65 l. water at a temperature of 92° C., adding then the same amounts of n-dodecylamine acetate and dimethyl ethanol amine acetate as in A. The temperature of the water bath of the evaporator was adjusted at 95° C.

(C) A third experiment was carried out, using 12 kg. ammonium nitrate in 2.1 l. water at a temperature of 82° C. and adding the same amounts of n-dodecylamine and dimethyl ethanol amine acetate as in A and B. The temperature of the water bath of the evaporator was kept constantly at 85° C. The period of evaporation was adjusted in such a way as the obtain an ammonium nitrate in the three instances A, B, and C, whose moisture contents ranged between 0.25 and 0.35% related to the wet product.

After a 1-day storage of these ammonium nitrate samples 2 kg. mixtures were produced in the following composition:

Percent
Ammonium nitrate _____ 96
Fuel oil No. 4 _____ 4

In the case of sample A an insensitivity towards detonators, No. 6 and No. 8, was observed.

In the case of sample B an insensitivity towards detonator No. 6 but a sensitivity towards detonator No. 8 was observed. The explosive performances of this mixture were the following:

Excavation value according to Trauzl—300 cm.³
Upsetting value according to Hess (dual strength steel disc)—9.5 mm.
Detonation speed according to Dautriche (zinc pipe—30 mm. φ)—3150 m./sec.
Detonation transmission on sand, in 22 mm. φ per 175 mm. length—zero negative For sample C high performance explosion data, as already known, were found out.

After having stored samples A, B and C for one week these 2 kg.-mixtures were again prepared, consequently observing an insensitivity towards detonators (No. 6 and No. 8) for chemicals A and B. Chemical C showed the same high performance explosion characteristics as before.

After another 1-month and 6-month storage of sample C the corresponding explosive chemicals offered excellent explosive performances, very much like those of Example 2.

To round off this series of tests the ammonium nitrate chemicals A, B, and C were repeated again, this time however without adding dimethyl ethanolamine acetate. Just as in the case of the examples described above a rapid insensitivity towards detonators of the corresponding 4% fuel oil mixtures was observed.

This series of tests also showed the necessity not to exceed an operating temperature of 90° C.

EXAMPLE 5

5 g. conventional ammonium nitrate and 5 g. ammonium nitrate produced according to the process of the present invention were weighed in two scales of 5 cm. diameter in layers as thin as possible, and then spread out. Both scales were then put into an air-tight glass container with a relative moisture of 75% (adjusted by means of a sulphuric acid solution of adequate vapor pressure). After remaining there for 24 hours analysis showed a 2.1% increase of weight, related to the original weight of the test piece, in the case of the conventional ammonium nitrate.

With the ammonium nitrate produced according to the method of the present invention the moisture pick up amounted to a 7.5% related to the original weight of the test piece increase of weight. This test was repeated in an atmosphere of 100% relative moisture, observing an increase of weight by 3.3%, related to the original weight of the test piece, in the first instance (conventional ammonium nitrate) and a complete dissolution of the material in the second instance (lipophilic ammonium nitrate). These comprative tests serve to demonstrate the unexpectedly greater hydrophilic character of the lipophilic ammonium nitrate.

While I have disclosed one embodiment of the present invention, it is to be understood that this embodiment is given by example only and not in a limiting sense.

I claim:

1. A method of producing microcrystalline ammonium nitrate comprising the step of crystallizing concentrated solutions of ammonium nitrate in the presence of salts of primary amino alkanes in an amount of from 0.1 to 5%, related to the weight of ammonium nitrate by weight, having chain-lengths ranging from $C_8$ to $C_{18}$, and in the presence of salts of short-chained amino alkanols in an amount of from 0.2 to 5% by weight, at a temperature between 20° and 90° C.

2. The method, as set forth in claim 1, wherein said amount of said salts of primary amino alkanes is from 0.2 to 1% by weight.

3. The method, as set forth in claim 1, wherein said salts of primary amino alkanes have chain-lengths ranging from $C_{12}$ to $C_{14}$.

4. The method, as set forth in claim 1, wherein said amount of said salts of short chained amino alkanols with four carbon atoms per chain is from 0.4 to 1% by weight, related to the weight of ammonium nitrate.

References Cited

UNITED STATES PATENTS

| 3,250,607 | 5/1966 | Sawyer | 71—59 |
| 3,468,624 | 9/1969 | Miller | 23—103 |

FOREIGN PATENTS

| 595,712 | 4/1960 | Canada | 23—103 |
| 866,393 | 4/1961 | Great Britain | 23—103 |

NORMAN YUDKOFF, Primary Examiner

A. F. PURCELL, Assistant Examiner

U.S. Cl. X.R.

23—103, 302; 71—59